Jan. 6, 1925.
A. T. KOPPE
1,521,633
PHOTOGRAPHIC PLATE CENTERING DEVICE
Filed Aug. 23, 1922  3 Sheets-Sheet 1
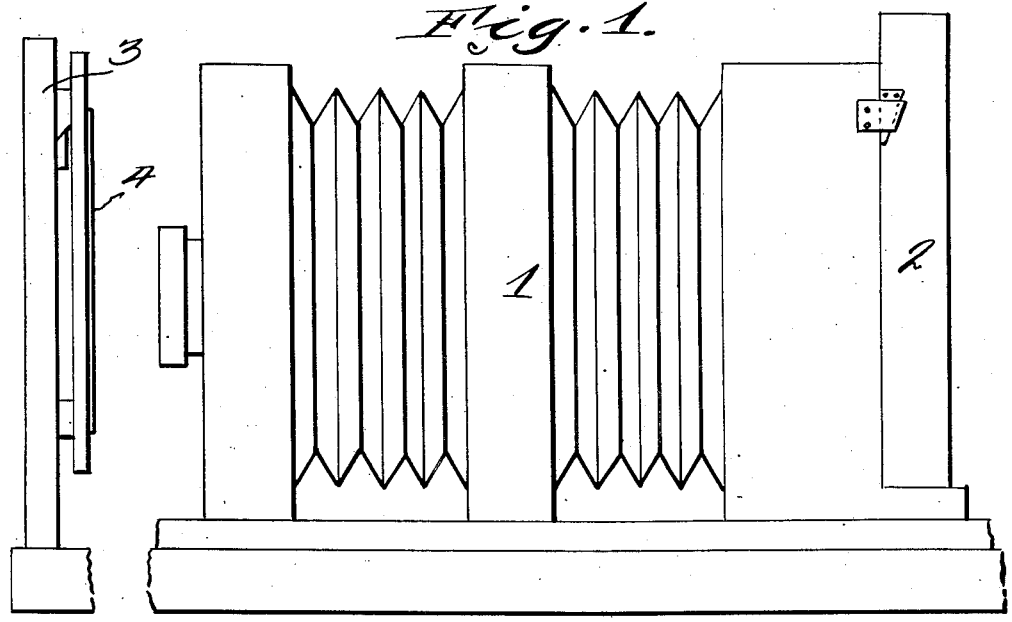
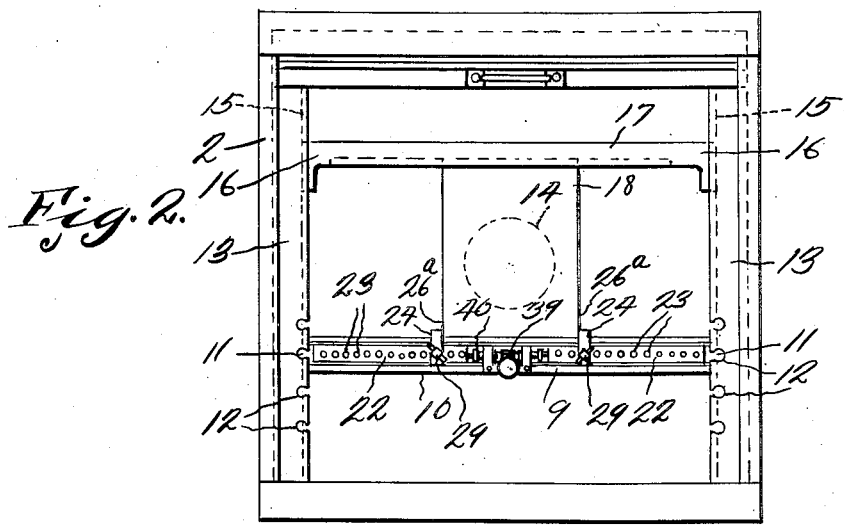
INVENTOR.
Alexander T. Koppe
BY
ATTORNEY.

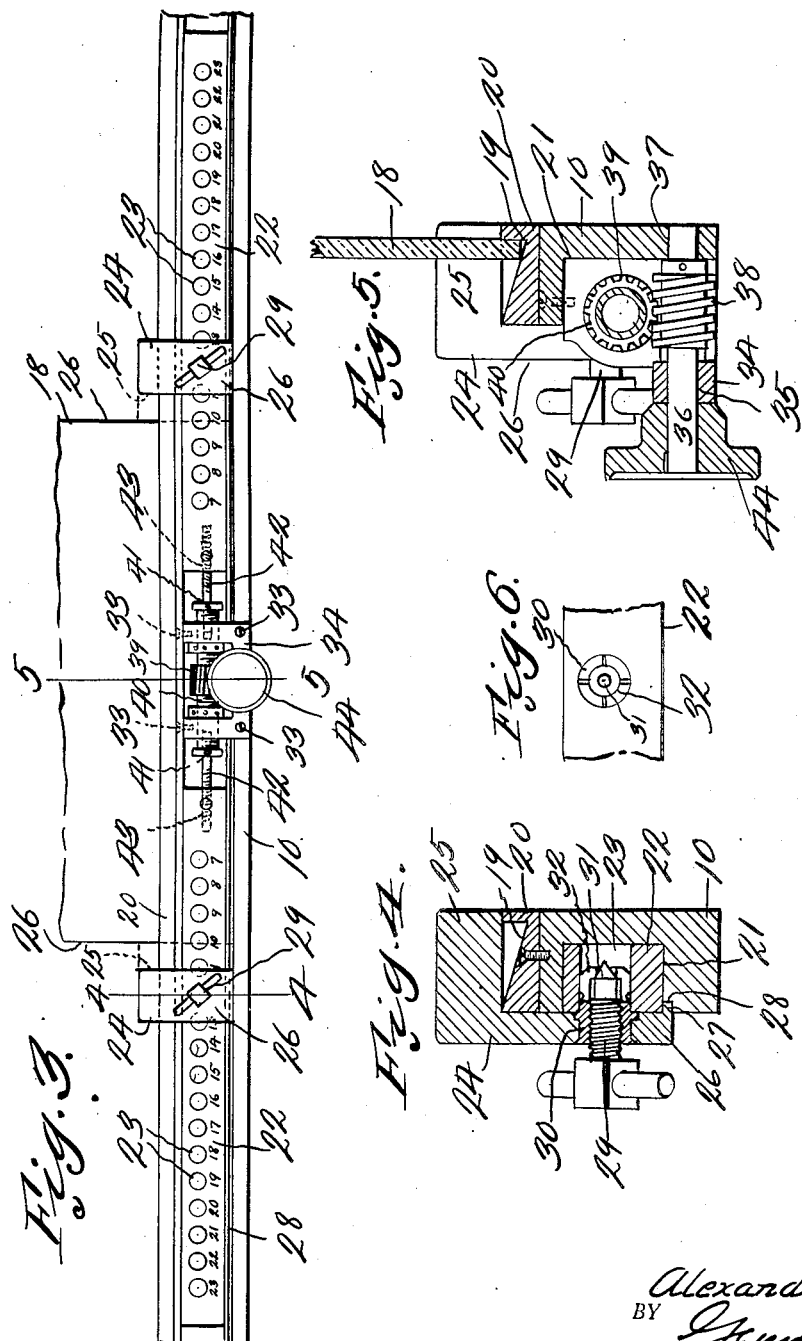

Jan. 6, 1925. 1,521,633
A. T. KOPPE
PHOTOGRAPHIC PLATE CENTERING DEVICE
Filed Aug. 23, 1922 3 Sheets-Sheet 3
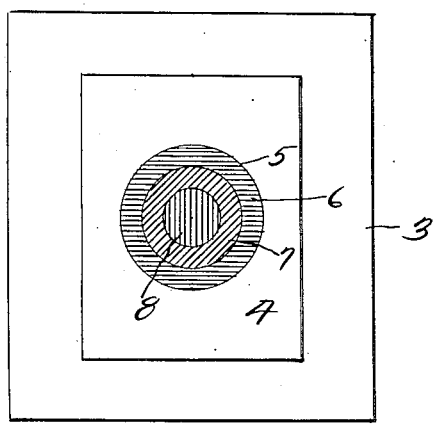
Fig. 7.
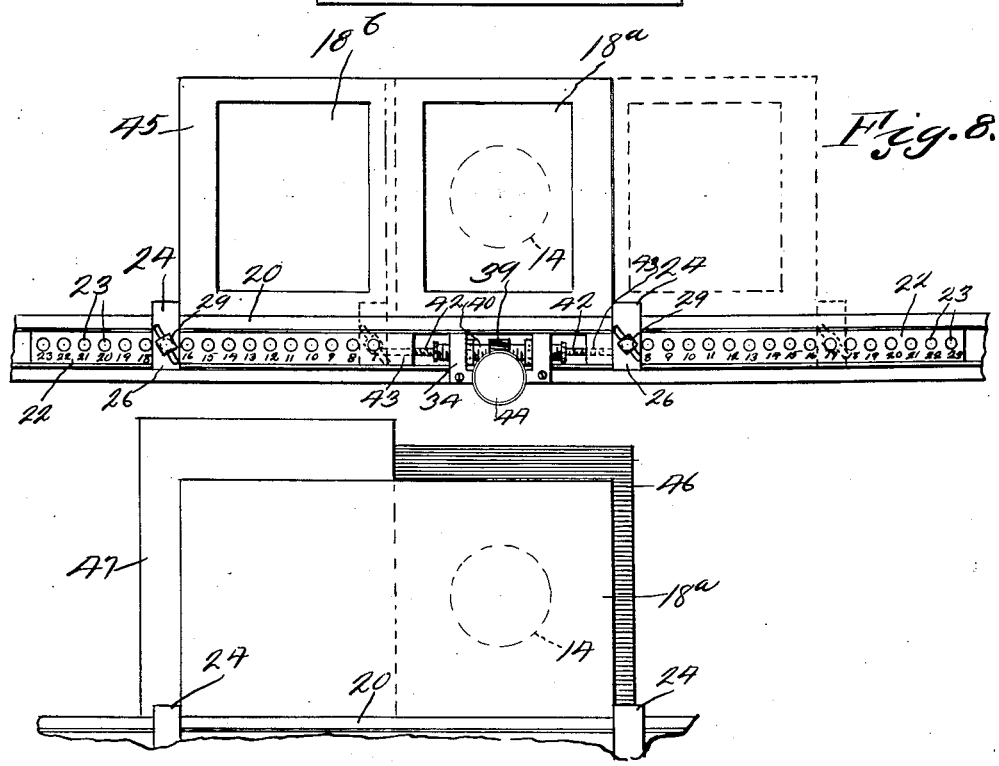
Fig. 8.
Fig. 9.
INVENTOR.
Alexander T. Koppe
BY
ATTORNEY.

Patented Jan. 6, 1925.

1,521,633

UNITED STATES PATENT OFFICE.

ALEXANDER T. KOPPE, OF CHICAGO, ILLINOIS, ASSIGNOR TO OFFSET DIRECTOPLATE COMPANY, OF CHICAGO, ILLINOIS, A CORPORATION OF ILLINOIS.

PHOTOGRAPHIC-PLATE-CENTERING DEVICE.

Application filed August 23, 1922. Serial No. 583,751.

*To all whom it may concern:*

Be it known that I, ALEXANDER T. KOPPE, a citizen of the United States, residing at Chicago, in the county of Cook and State of Illinois, have invented certain new and useful Improvements in Photographic-Plate-Centering Devices, of which the following is a specification.

The invention relates to photographic plate centering devices, and has for its object to provide a device of this character, which is mounted in the plate holder of the camera, and constructed in such a manner whereby plates may be accurately centered, removed and replaced if so desired, and whereby successive plates, for instance of the type used in color photography may be accurately centered, even if their size varies. It has been found that photographic plates vary slightly, in dimensions, which variation prevents proper registration when the plates are placed in a press plate machine, such for instance as set forth in my application for patent filed 30th day of June 1922, Serial No. 572,054.

A further object is to mount the plate centering device in the plate holder of the camera, and on which device the plate is supported. Also to provide a vertically slidable member in the plate holder for engaging and holding the upper end of the plate and to provide spaced notches for receiving the ends of the supporting bar of the plate centering device, whereby the centering device as a whole may be adjusted upwardly or downwardly for placing the plate in registration with the camera lens.

A further object is to provide a photographic plate centering device comprising a bar on which a plate is slidably supported, aligned apertured bars slidably mounted in a channel of the supporting bar, any of the apertures of which receive and hold plate engaging members, the slidable bars having their apertures correspondingly numbered whereby the plate engaging members may be removed and replaced with accuracy. The slidable bars are adjustable inwardly and outwardly simultaneously by means of right and left handed threaded shafts, which are threaded into the bars, and which are simultaneously rotated through a worm and worm gear connection. The simultaneous movement of the slidable bars forming means for centering the plate in relation to the lens center and the subject carried by the copy board irrespective of the variation in the width of the plate.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a side elevation of a conventional form of camera and the plate holder, showing the copy board in front of the camera.

Figure 2 is a rear view of the plate holder showing the cover in open position and the plate centering device in the holder.

Figure 3 is an enlarged rear elevation of the plate centering device.

Figure 4 is a vertical transverse sectional view through the plate centering device taken on line 4—4 of Figure 3.

Figure 5 is a vertical transverse sectional view through the plate centering device taken on line 5—5 of Figure 3.

Figure 6 is a view of the inner end of one of the locking sleeves, and a portion of one of the slide bars.

Figure 7 is a front elevation of the copy board showing a copy thereon.

Figure 8 is a rear elevation of the centering device showing a double plate and in dotted lines the shifted position of the plate and plate engaging members.

Figure 9 is a rear elevation of the plate, showing a color separating screen and a mask in connection therewith, the plate being a double one.

Referring to the drawings, the numeral 1 designates a conventional form of camera and 2 the plate holder carried thereby. Disposed in front of the camera is a copy board 3 on which is disposed a copy 4 having the colored subject 5 thereon. The subject 5, for purposes of illustration, is shown as comprising concentric rings 6 and 7, and a central round portion 8. It has been found in colored photography, wherein subjects are placed on dry plates forming negatives, and then placed in an offset press plate machine of the type set forth in the application mentioned above, and reproduced on a sensitized plate, the variations incident to the dimensions of the negatives will at times prevent perfect registration. To obviate this difficulty and center the subject on the photographic dry plate, no matter what the variation of width in the plate or successive plates may be, the plate holder 2 is provided with a plate centering device 9, which centering device comprises a horizontally disposed supporting bar 10, the ends of which are provided with tongues 11, which are received in recesses 12, of the vertical side bars 13 of the plate holder 2. It will be seen that the horizontally disposed bar may be adjusted to various positions in a vertical plane within the plate holder 2 according to the position of the lens 14 of the camera. The side bars 13 of the plate holder are provided with vertically disposed channels 15 in their inner faces, in which channels are slidably mounted the ends 16 of the horizontally disposed plate holding bar 17. The bar 17 engages the upper end of the dry plate 18, and when the dry plate is resting in the groove 19 of the bar 20 carried by the upper side of the horizontally disposed bar 10, the dry plate is held in a vertical plane.

Slidably mounted in a horizontally disposed channel 21 of the supporting bar 10 at opposite sides of the center of the bar and the center of the lens 14 are horizontally aligned slidable gage bars 22, which bars are provided with a plurality of spaced apertures 23, which apertures are equally spaced from each other, and the corresponding apertures at each side of the center of the bar 10 are correspondingly numbered as clearly shown in Figure 3. Detachably secured to the slidable bars 22 are L-shaped members 24, the arms 25 of which overlie the channel 19 of the bar 20, and are adapted to engage the opposite sides 26ª of the dry plate 18, when the bars 22 are moved towards each other for centering the dry plate in relation to the center of the lens 14 of the camera. The arms 26 of the members 24 extend downwardly and engage the outer faces of the bars 22 and are preferably provided with flanges 27 which engage in a channel 28 of the bar 10. The members 24 are removable from the bars 22, however they may be securely held and secured to the bars 22 by means of the set screws 29, which are threaded through sleeves 30 carried by the arms 26 of the members 24. The inner ends of the set screws 29 are tapered as shown at 31, and engage within the split ends 32 of the sleeves 30, and spread the same in such a manner that they will frictionally engage the walls of the apertures 23, thereby securely holding the members 24 on the bars 22 and at the same time allowing the members 24 to be easily removed when it is desired to adjust the members 24 in registration with other apertures 23. The members 24 are placed in registration with corresponding apertures of the bars 22 as shown in Figure 3, thereby placing the plate engaging arms 25 adjacent the sides 26ª of the dry plate, but sufficiently far enough therefrom to accommodate the centering device to maximum variations of widths of plates 18. Secured centrally of the bar 10, and centrally in relation to the lens 14, by means of screws 33 is a bracket 34. The bracket 34 is provided with a bearing 35, in which is rotatably mounted a transversely disposed shaft 36, the inner end of said shaft 36 being rotatably mounted in a bearing 37 of the bar 10, and is provided with a worm 38. The worm 38 meshes with a worm gear 39 carried by a sleeve 40, which is rotatably mounted in the bracket 34, and disposed within the channel 21 of the bar 10. Secured to the outer ends of the sleeve 40, by means of pins 41 are axially aligned shafts 42, the outer ends of which are threaded at 43 into the ends of the slidable bars 22, and are provided with right and left hand thread as clearly shown in Figure 3. It will be seen that when the sleeve 40 is rotated in either direction, the shafts 42 will be simultaneously rotated and consequently the slidable bars 22 will be simultaneously moved inwardly or outwardly as desired. When the bars 22 are moved inwardly at the same rate of speed, it is obvious that the plate engaging arms 25 will move inwardly the same distance, and will engage the sides 26ª of the plate 18 and center the plate in relation to the center of the lens 14. It will also be seen that successive plates, even though they vary in width, incident to manufacture, will be accurately centered. The shaft 36 is provided with a finger engaging wheel 44, by means of which the worm 38 may be easily turned for moving the slidable bars 22 inwardly for centering the plate 18, or outwardly when the plate is being removed. By providing a plurality of apertures 23 in the slide bars 22, it is obvious that the device may be adjusted for use in connection with various sizes of plates, however by referring to Figure 8, it will be seen that the device is adjusted for use in connection with a large plate 18ª, over which a dummy layout 45 is disposed. In this form after the portion of the plate 18ª, which is disposed in registration with the lens 14, is utilized, the plate 18ª may be shifted to the dotted line position shown in Figure 8, and the portion 18ᵇ of the plate 18ª positioned and centered in relation to the lens 14.

Referring to Figure 9, the double or large dry plate 18ª is shown with a color separating screen 46 and a mask 47.

From the above it will be seen that a plate centering device is provided for camera plate holders wherein successive plates may be easily and quickly positioned and centered irrespective of the width of plates. It will also be seen that the device is entirely housed within the plate holder, and that the same may be adjusted for plates of different heights as well as widths, and consequently successive plates may be made, the objects on which will register when used in connection with an offset press plate machine, particularly of the character set forth above.

The invention having been set forth what is claimed as new and useful is:—

1. The combination with a plate holder, of a plate centering device carried by said holder, said centering device comprising a plate supporting bar, slidable apertured bars carried by the plate supporting bar, adjustable plate engaging members carried by the slidable apertured bars, means whereby the plate engaging members may be secured to the slidable bars in registration with any of the apertures, and means whereby said slidable bars may be moved towards and away from each other.

2. The combination with a plate holder, of a plate centering device carried thereby, said plate centering device comprising a plate supporting bar, slidable bars carried by said bar, plate engaging stops adjustably carried by the slidable bar and adapted to engage the opposite edges of a plate, and means carried by the plate supporting bar for simultaneously moving the slidable bars towards and away from each other.

3. The combination with a plate holder, of a plate centering device carried thereby, said plate centering device comprising a plate supporting bar, inwardly and outwardly adjustable apertured bars carried by the supporting bar, plate engaging members carried by the adjustable bars, means for attaching the plate engaging members to the adjustable bars in registration with any of the apertures therein, and means carried by the plate supporting bar for moving the apertured bar simultaneously outwardly and inwardly.

4. The combination with a camera plate holder, of a plate supporting and centering device carried by said plate holder, said device comprising a horizontally disposed bar, aligned slidable apertured bars carried by the horizontally disposed bars, plate engaging members carried by the aligned apertured bars, means whereby said plate engaging members may be attached at various positions on the apertured bars, right and left handed screws threaded into the adjacent ends of the apertured bars, and means for simultaneously rotating said right and left handed threaded screws.

5. The combination with a plate holder, of a plate centering device carried by said holder, said centering device comprising a plate supporting bar, alined endwise slidable bars carried by the plate supporting bar, plate engaging members adjustable on said slidable bars adapted to engage the opposite edges of plates of various sizes by the movement of the slidable bars, and means for simultaneously moving said slidable bars towards and away from each other.

In testimony whereof I affix my signature.

ALEXANDER T. KOPPE.